US012671128B2

(12) United States Patent
Yu et al.

(10) Patent No.: US 12,671,128 B2
(45) Date of Patent: Jun. 30, 2026

(54) BATTERY MODULE, AND BATTERY PACK AND VEHICLE COMPRISING SAME

(71) Applicant: LG ENERGY SOLUTION, LTD., Seoul (KR)

(72) Inventors: Sang-Hyun Yu, Daejeon (KR); Won-Hoe Ku, Daejeon (KR); Han-Ki Yoon, Daejeon (KR); Yu-Dam Kong, Daejeon (KR); Jin-Kyu Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 641 days.

(21) Appl. No.: 18/014,708

(22) PCT Filed: Jan. 7, 2022

(86) PCT No.: PCT/KR2022/000341
§ 371 (c)(1),
(2) Date: Jan. 5, 2023

(87) PCT Pub. No.: WO2022/149926
PCT Pub. Date: Jul. 14, 2022

(65) Prior Publication Data
US 2023/0291030 A1 Sep. 14, 2023

(30) Foreign Application Priority Data

Jan. 8, 2021 (KR) ........................ 10-2021-0002824

(51) Int. Cl.
*H01M 10/6563* (2014.01)
*H01M 10/613* (2014.01)
(Continued)

(52) U.S. Cl.
CPC ..... *H01M 10/6563* (2015.04); *H01M 10/613* (2015.04); *H01M 10/625* (2015.04);
(Continued)

(58) Field of Classification Search
CPC ........... H01M 10/6563; H01M 10/613; H01M 10/625; H01M 10/6554; H01M 10/6566;
(Continued)

(56) References Cited

U.S. PATENT DOCUMENTS

2003/0027037 A1    2/2003  Moores, Jr. et al.
2006/0091856 A1    5/2006  Lee et al.
(Continued)

FOREIGN PATENT DOCUMENTS

CN    107887537 A  *  4/2018    ........ H01M 10/6563
CN    211480235 U  *  9/2020    ............. Y02E 60/10
(Continued)

OTHER PUBLICATIONS

International Search Report for PCT/KR2022/000341 (PCT/ISA/210) mailed on Apr. 19, 2022.
(Continued)

*Primary Examiner* — Kaity V Chandler
(74) *Attorney, Agent, or Firm* — Birch, Stewart, Kolasch & Birch, LLP

(57) ABSTRACT

Discussed are a battery module, and a battery pack and a vehicle including the battery module. A battery module may includes a plurality of battery cell stacks, each battery cell stack including a plurality of battery cells that are stacked therein, a case to accommodate the plurality of battery cell stacks, an air circulation duct between the plurality of battery cell stacks and having a plurality of holes formed therein, and an exhaust fan coupled to a side of the air circulation duct, wherein the plurality of holes of the air circulation duct may have different sizes.

13 Claims, 6 Drawing Sheets

(51) Int. Cl.
>  *H01M 10/625* (2014.01)
>  *H01M 10/6554* (2014.01)
>  *H01M 10/6566* (2014.01)
>  *H01M 50/204* (2021.01)

(52) U.S. Cl.
>  CPC ... *H01M 10/6554* (2015.04); *H01M 10/6566* (2015.04); *H01M 50/204* (2021.01); *H01M 2220/20* (2013.01)

(58) Field of Classification Search
>  CPC .......... H01M 50/204; H01M 2220/20; H01M 50/249; H01M 10/617; H01M 10/652; H01M 10/6557; Y02E 60/10
>  See application file for complete search history.

(56) References Cited

U.S. PATENT DOCUMENTS

| | | |
|---|---|---|
| 2006/0115714 A1 | 6/2006 | Lee et al. |
| 2010/0000816 A1 | 1/2010 | Okada |
| 2010/0285347 A1 | 11/2010 | Saito et al. |
| 2014/0072844 A1 | 3/2014 | Oh et al. |
| 2018/0138560 A1* | 5/2018 | Bessho ............ H01M 10/6555 |
| 2018/0178675 A1 | 6/2018 | Suzuki et al. |
| 2018/0233790 A1 | 8/2018 | Son |
| 2018/0358646 A1 | 12/2018 | Yu et al. |
| 2020/0313262 A1 | 10/2020 | Suzuki et al. |
| 2020/0321666 A1 | 10/2020 | Kim |

FOREIGN PATENT DOCUMENTS

| | | | |
|---|---|---|---|
| JP | 2001-256940 A | 9/2001 | |
| JP | 2002141114 A * | 5/2002 | ............ Y02E 60/10 |
| JP | 2006-24510 A | 1/2006 | |
| JP | 2011-23180 A | 2/2011 | |
| JP | 2014-53277 A | 3/2014 | |
| JP | 5436924 B2 | 3/2014 | |
| JP | 2015-41605 A | 3/2015 | |
| JP | 2017-62918 A | 3/2017 | |
| JP | 2020-161216 A | 10/2020 | |
| JP | 2020-161219 A | 10/2020 | |
| KR | 10-2009-0062854 A | 6/2009 | |
| KR | 10-2010-0005666 A | 1/2010 | |
| KR | 10-1262974 B1 | 5/2013 | |
| KR | 10-2017-0095144 A | 8/2017 | |
| KR | 10-1888298 B1 | 8/2018 | |
| KR | 10-2019-0004351 A | 1/2019 | |
| WO | WO 2015/029865 A1 | 3/2015 | |
| WO | WO 2017/154071 A1 | 9/2017 | |

OTHER PUBLICATIONS

Extended European Search Report for European Application No. 22736903.0, dated Sep. 3, 2024.

* cited by examiner

BATTERY MODULE, AND BATTERY PACK AND VEHICLE COMPRISING SAME

TECHNICAL FIELD

The present application claims priority to Korean Patent Application No. 10-2021-0002824 filed on Jan. 8, 2021 in the Republic of Korea, the disclosures of which are incorporated herein by reference.

The present disclosure relates to a battery module, and a battery pack and a vehicle including the same, and more particularly, to a battery module capable of increasing life expectancy, and a battery pack and a vehicle including the battery module.

BACKGROUND ART

As the development and demand for mobile devices has increased, the demand for secondary batteries as energy sources has rapidly increased. Nickel cadmium batteries or hydrogen ion batteries have been used as conventional secondary batteries, but recently, lithium secondary batteries having little memory effect compared to nickel-based secondary batteries, free charging and discharging, a very low self-discharge rate, and high energy density have been widely used.

A lithium secondary battery mainly uses a lithium-based oxide and a carbon material as a positive electrode active material and a negative electrode active material. A lithium secondary battery includes an electrode assembly in which a positive electrode plate and a negative electrode plate to which a positive electrode active material and a negative electrode active material are respectively applied located with a separator therebetween, and a casing in which the electrode assembly is air-tightly accommodated with an electrolyte, that is, a battery case.

A lithium secondary battery includes a positive electrode, a negative electrode, a separator located between the positive electrode and the negative electrode, and an electrolyte, and is divided into a lithium-ion battery (LIB), a polymer lithium-ion battery (PLIB), and the like according to which of a positive electrode active material and a negative electrode active material is used. In general, an electrode of a lithium secondary battery is formed by applying a positive electrode or negative electrode active material to a current collector such as an aluminum or copper sheet, a mesh, a film, or a foil and then drying the same. Various types of secondary batteries include a case for protecting a battery cell, a battery module in which a plurality of battery cells are stacked and inserted into the case, and a battery pack in which a plurality of battery modules are included.

Battery cells may be electrically connected to one another through a bus bar that is a conductor. In general, a positive electrode lead is formed of an aluminum material, a negative electrode lead is formed of a copper material, and a bus bar is also formed of a copper material.

When battery cells provided in a battery module are continuously used, heat is generated from the battery cells and thus, the battery cells are cooled in various ways. For example, an exhaust fan may be provided, and air may be moved by the exhaust fan to cool the battery cells.

However, when a length of a duct coupled to a conventional exhaust fan is increased, battery cells located far from the exhaust fan are not well cooled compared to battery cells located close to the exhaust fan, and thus, lifetimes of the battery cells are different, thereby lowering a lifetime of a battery module.

DISCLOSURE

Technical Problem

The present disclosure is designed to solve the problems of the related art, and therefore the present disclosure is directed to providing a battery module capable of increasing life expectancy by minimizing a temperature difference between battery cells through uniform cooling, regardless of positions of the battery cells, and a battery pack and a vehicle including the battery module.

Technical Solution

According to an aspect of the present disclosure, there is provided a battery module including: a plurality of battery cell stacks, each battery cell stack including a plurality of battery cells that are stacked therein; a case to accommodate the plurality of battery cell stacks; an air circulation duct between the plurality of battery cell stacks and having a plurality of holes formed therein; and an exhaust fan coupled to a side of the air circulation duct, wherein the plurality of holes of the air circulation duct have different sizes.

The plurality of battery cell stacks may be arranged in at least two rows and at least two columns, and wherein the air circulation duct may be between the plurality of battery cell stacks at a location between the at least two rows or between the at least two columns.

The plurality of holes of the air circulation duct may be provided so that a hole closest to the exhaust fan is has a smallest size from among the plurality of holes, and a size of the plurality of holes may increase away from the exhaust fan.

The plurality of battery cells may be surrounded by an end plate that comprises an upper end plate, a lower end plate, and a side end plate, wherein an air inlet is formed in the side end plate, wherein an air cooling plate having a hollow portion in which air flows is located between the plurality of battery cells, and wherein the air inlet of the side end plate and the hollow portion of the air cooling plate are provided at a same height of the battery module.

At least one partition wall may be formed in the hollow portion of the air cooling plate.

The at least one partition wall may be provide in plural, and the plurality of partition walls may be arranged at equal intervals.

The case may include an upper cover, a side cover, and a lower cover, and wherein the side cover is not located where the air inlet is located so that the air inlet is exposed to an outside.

An air passage may be formed in the upper cover, and wherein air moving through the air passage toward the plurality of battery cell stacks passes through the air inlet and moves to the air circulation duct.

According to another aspect of the present disclosure, there are provided a battery pack and a vehicle including the battery module.

Advantageous Effects

According to embodiments of the present disclosure, life expectancy may be increased by minimizing a temperature difference between battery cells through uniform cooling regardless of positions of the battery cells by changing an overall structure.

BEST MODE

Figure 1:
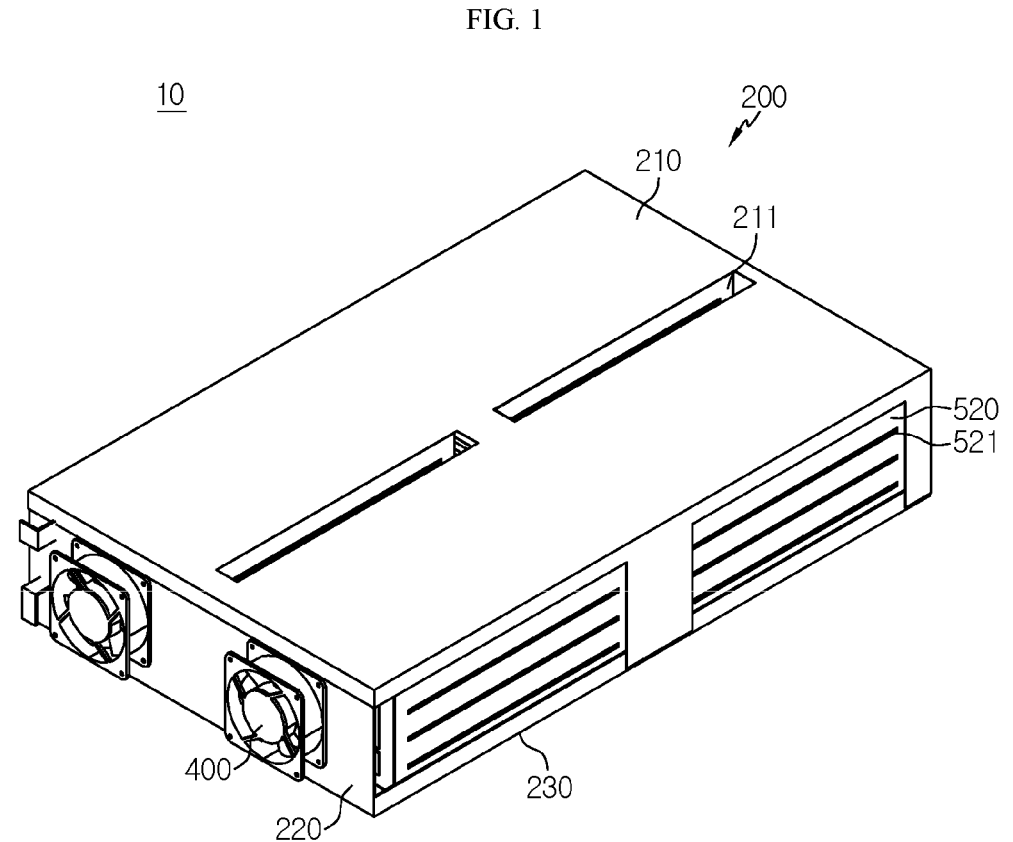
FIG. 1 is a perspective view illustrating a battery module according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

The size of each element or a specific portion of the element shown in the drawings may be exaggerated, omitted or schematically drawn for the purpose of convenience and clarity of explanation. Accordingly, the size of each element may not substantially reflect its actual size. While describing the present disclosure, detailed descriptions of related well-known functions or configurations that may blur the points of the present disclosure are omitted.

Also, in the present specification, it will be understood that when elements are "connected" or "coupled" to each other, the elements may be directly connected or coupled to each other, or may be indirectly connected or coupled to each other with an intervening element therebetween.

Figure 2:
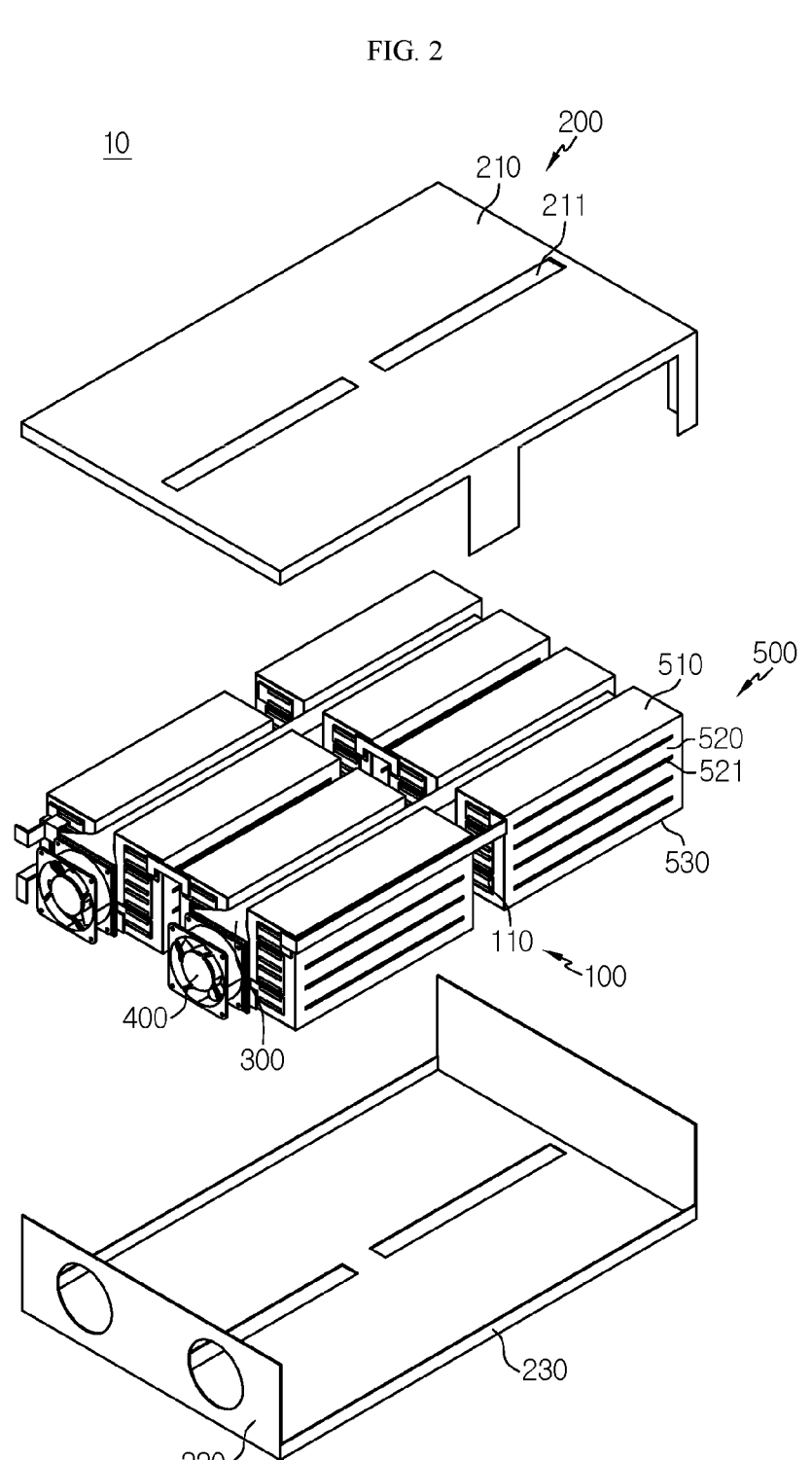
FIG. 2 is an exploded perspective view illustrating a battery module according to an embodiment of the present disclosure.
Figure 3:
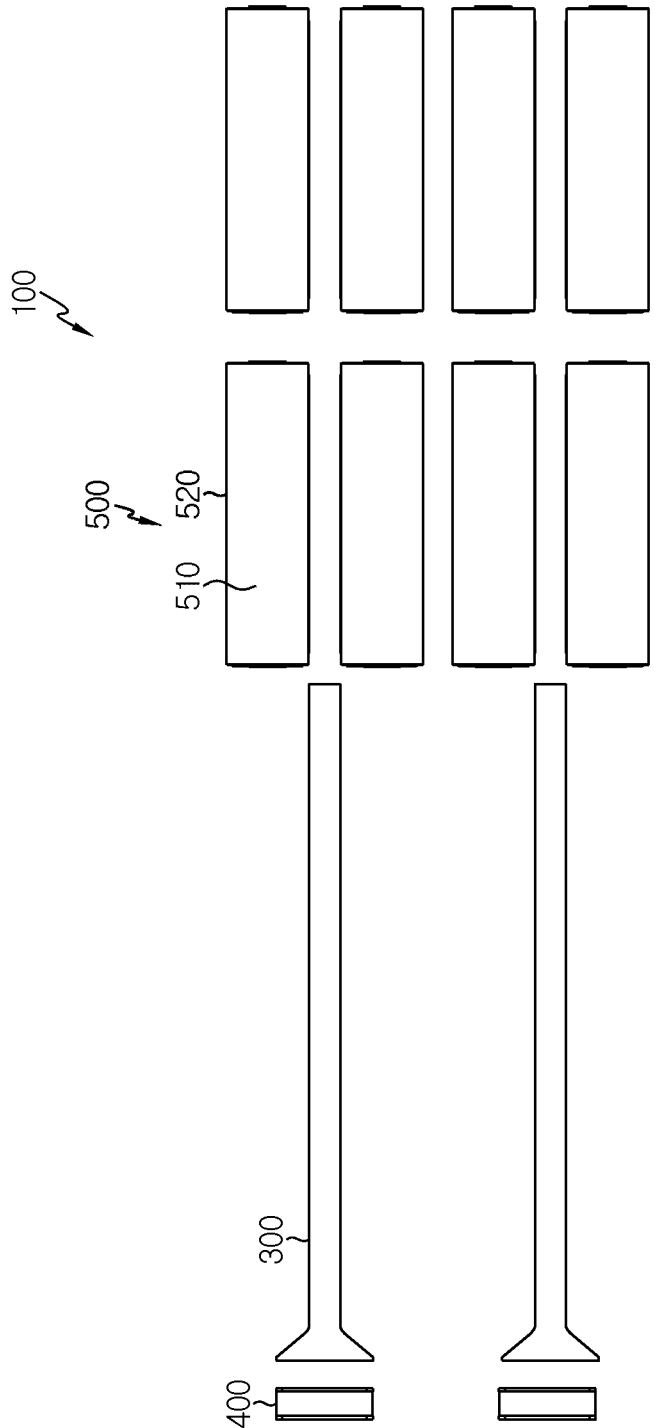
FIG. 3 is a plan view illustrating a battery cell stack, an air circulation duct, and an exhaust fan which are separated in a battery module according to an embodiment of the present disclosure.
Figure 4:
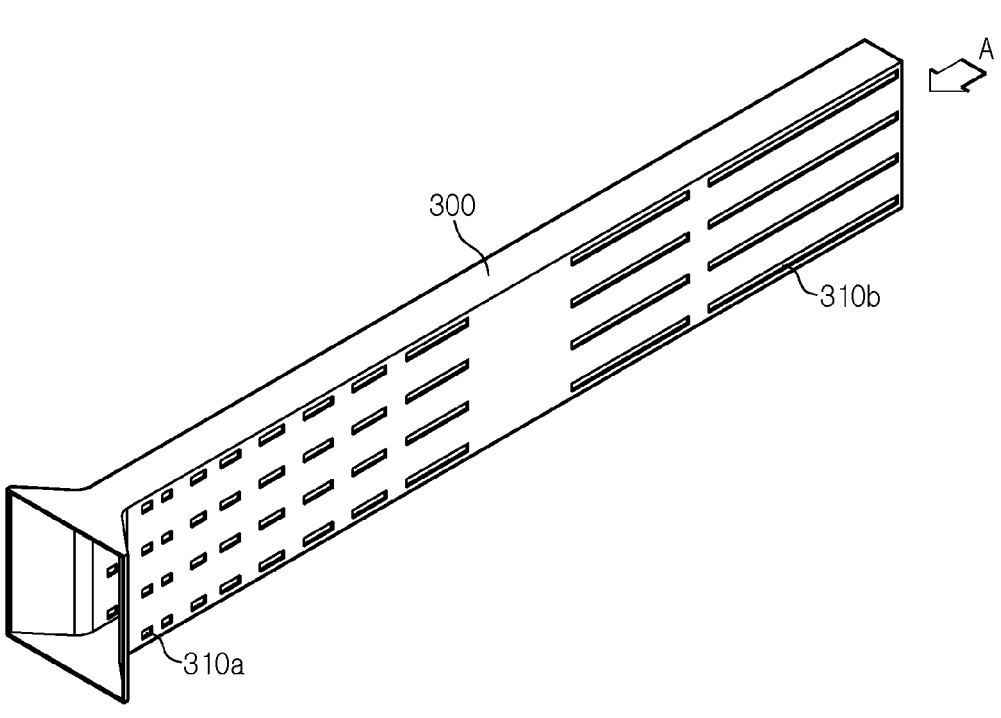
FIG. 4 is a perspective view illustrating an air circulation duct in a battery module according to an embodiment of the present disclosure.
Figure 5:
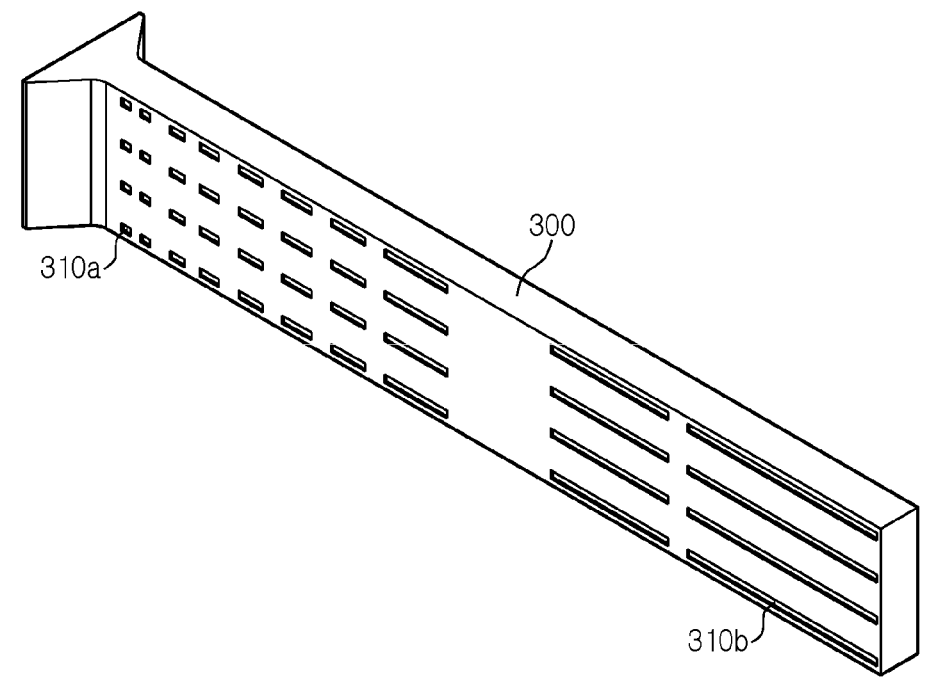
FIG. 5 is a view viewed in an arrow direction A of FIG. 4.
Figure 6:
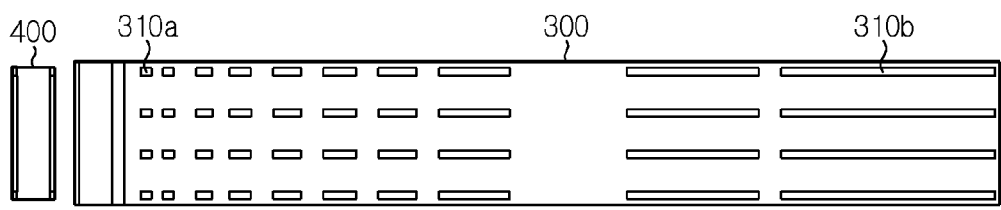
FIG. 6 is a view illustrating an air circulation duct and an exhaust fan which are separated in a battery module according to an embodiment of the present disclosure.
Figure 7:
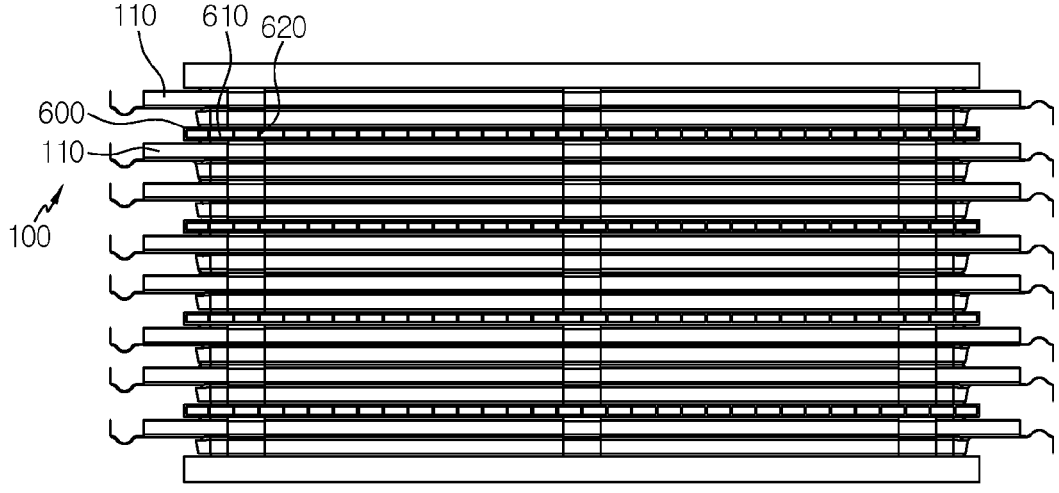
FIG. 7 is a cross-sectional view illustrating an air cooling plate located between battery cells in a battery module according to an embodiment of the present disclosure.
Figure 8:
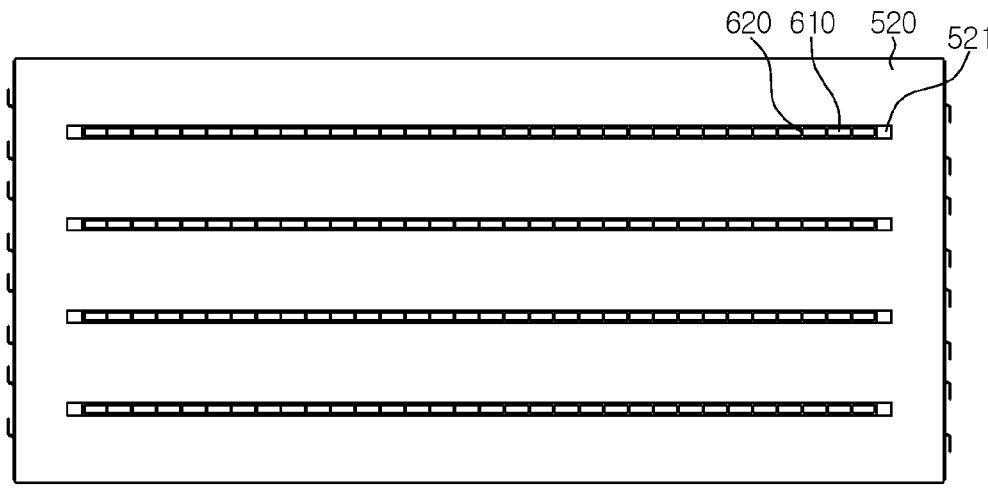
FIG. 8 is a side view illustrating an air inlet is formed in a side end plate in a battery module according to an embodiment of the present disclosure.

FIG. 1 is a perspective view illustrating a battery module according to an embodiment of the present disclosure. FIG. 2 is an exploded perspective view illustrating a battery module according to an embodiment of the present disclosure. FIG. 3 is a plan view illustrating a battery cell stack, an air circulation duct, and an exhaust fan which are separated in a battery module according to an embodiment of the present disclosure. FIG. 4 is a perspective view illustrating an air circulation duct in a battery module according to an embodiment of the present disclosure. FIG. 5 is a view viewed in an arrow direction A of FIG. 4. FIG. 6 is a view illustrating an air circulation duct and an exhaust fan which are separated in a battery module according to an embodiment of the present disclosure. FIG. 7 is a cross-sectional view illustrating an air cooling plate located between battery cells in a battery module according to an embodiment of the present disclosure. FIG. 8 is a side view illustrating an air inlet formed in a side end plate in a battery module according to an embodiment of the present disclosure.

Referring to FIGS. 1 through 8, a battery module 10 according to an embodiment of the present disclosure includes a battery cell stack 100, a case 200, an air circulation duct 300, and an exhaust fan 400.

In the battery cell stack 100, a plurality of battery cells 110 provided with electrode leads are stacked. Referring to FIG. 2, the plurality of battery cell stacks 100 are arranged in at least two rows and at least two columns.

The electrode lead provided in the battery cell 110 may be a terminal externally exposed to be connected to an external device and may be formed of a conductive material.

The electrode leads may include a positive electrode lead and a negative electrode lead. The positive electrode lead and the negative electrode lead may be arranged in opposite directions in a longitudinal direction of the battery cell 110, or the positive electrode lead and the negative electrode lead may be arranged in the same direction in the longitudinal direction of the battery cell 110.

The positive electrode lead and the negative electrode lead may be formed of various materials. For example, the positive electrode lead may be formed of an aluminum material and the negative electrode lead may be formed of a copper material.

The electrode leads may be electrically connected by a bus bar (not shown). The battery cell 110 may have a structure in which a plurality of unit cells arranged in an order of positive electrode plate-separator-negative electrode plate or bi-cells arranged in an order of positive electrode plate-separator-negative electrode plate-separator-positive electrode plate-separator-negative electrode plate are stacked according to battery capacity.

In the battery cell stack 100, a plurality of battery cells 110 may be stacked. The battery cell 110 may have any of various structures, and also, the plurality of battery cells 110 may be stacked in any of various ways.

The battery cell stack 100 may include a plurality of cartridges (not shown) in which the battery cells 110 are respectively accommodated. Each of the cartridges (not shown) may be manufactured by using plastic injection molding, and the plurality of cartridges (not shown) having a receiving portion in which the battery cell 110 may be accommodated may be stacked.

A cartridge assembly in which the plurality of cartridges (not shown) are stacked may include a connector element or a terminal element. The connector element may include, for example, any of various types of electrical connection components or connection members to be connected to a battery management system (BMS) for providing data about a voltage or a temperature of the battery cell 110.

Also, the terminal element may include a positive electrode terminal and a negative electrode terminal as a main terminal connected to the battery cell 110, and the terminal element may include a terminal bolt and may be electrically connected to the outside. The battery cell 110 may have any of various shapes.

Referring to FIGS. 1 and 2, the battery cell stack 100 or the cartridge assembly in which the battery cell stack 100 is accommodated is accommodated in the case 200. For example, the case 200 may surround the battery cell stack 100.

The case 200 entirely surrounds the battery cell stack 100 or a plurality of cartridge assemblies, and thus, protects the battery cell stack 100 or the cartridge assembly from external vibration or impact.

The case 200 may have a shape corresponding to a shape of the battery cell stack 100 or the cartridge assembly. For example, when the battery cell stack 100 or the cartridge assembly has a hexahedral shape, the case 200 may also have a corresponding hexahedral shape.

Referring to FIGS. 1 and 2, the case 200 may include an upper cover 210, a side cover 220, and a lower cover 230. As described below, an air inlet 521 may be formed in a side end plate 520 surrounding the battery cells 110, and the side cover 220 of the case 200 is removed from a portion where the air inlet 521 of the side end plate 520 is located so that the air inlet 521 is exposed to the outside.

Due to this structure, air may smoothly move through the air inlet 521 of the side end plate 520 toward the battery cells 110.

An air passage 211 may be formed in the upper cover 210, and air moving through the air passage 211 to the battery cell stack 100 passes through the air inlet 521 and moves to the air circulation duct 300, to cool the battery cells 110, which will be described below in detail with reference to FIG. 9.

The case 200 may be manufactured by, for example, bending a plate formed of a metal material, or may be manufactured by plastic injection molding. The case 200 may be manufactured as an integrated type, or may be manufactured as a separated type.

A through-portion (not shown) through which the connector element or the terminal element may be exposed to the outside may be formed in the case 200. That is, the connector element or the terminal element may be electrically connected to a certain external component or member, and the through-portion may be formed in the case 20 so that the electrical connection is not disturbed by the case 200.

Referring to FIGS. 2 through 4 together, the air circulation duct 300 is located between the plurality of battery cell stacks 100, and a plurality of holes 310 are formed in the air circulation duct 300.

Referring to FIGS. 4 through 6, the holes 310 of the air circulation duct 300 have different sizes. For example, as shown in FIG. 6, from among the holes 310 of the air circulation duct 300, a hole 310a closest to the exhaust fan 400 has a smallest size, a size of the hole 310 increases away from the exhaust fan 400, and a hole 310b farthest from the exhaust fan 400 has a largest size.

As such, as a size of the hole 310 of the air circulation duct 300 increases away from the exhaust fan, a large amount of air may be introduced at one time into the battery cells 110 located far from the exhaust fan 400.

That is, because a large amount of air is introduced at one time into the battery cells far from the exhaust fan to sufficiently cool the battery cells far from the exhaust fan, a temperature difference between the battery cells 110 may be minimized, thereby increasing life expectancy.

The exhaust fan 400 is coupled to only a side of the air circulation duct 300, and air outside the case 200 is introduced into the case 200 and then circulates to cool the battery cells 110.

The exhaust fan 400 is coupled to only an end portion, instead of both end portions, of the air circulation duct 300. Referring to FIG. 5, a rear side of the air circulation duct 300 is blocked.

The exhaust fan 400 may be provided in various ways, and includes various types of fans capable of circulating air.

Referring to FIG. 2, the plurality of battery cells 110 may be protected by an end plate 500. The end plate 500 may include an upper end plate 510, a lower end plate 530, and the side end plate 520, and the plurality of battery cells 110 may be surrounded by the upper end plate 510, the lower end plate 530, and the side end plate 520. The air inlet 521 is formed in the side end plate 520.

Referring to FIG. 7, an air cooling plate 600 may be located between the plurality of battery cells 110.

A plurality of air cooling plates 600 may be provided, and the plurality of air cooling plates 600 may be located between the plurality of battery cells 110. That is, the plurality of air cooling plates 600 are respectively located between the plurality of battery cells 110.

Referring to FIG. 7, a hollow portion 610 is formed in the air cooling plate 600 so that a fluid flows. That is, air moves along the hollow portion 610 in the air cooling plate 600, to cool the battery cells 110 contacting the air cooling plate 600. Accordingly, heat may be dissipated from each of the plurality of battery cells 110.

Also, the air cooling plate 600 is provided to have a preset stiffness not to be deformed even when the battery cell 110 swells.

During charging and discharging, gas may be generated in the battery cell 110 and the battery cell 110 may swell.

Because the air cooling plate 600 is located between the plurality of battery cells 110, if a stiffness of the air cooling plate 600 is weak, when the battery cells 110 swell, the air cooling plate 600 may be pressed and deformed to narrow the hollow portion 610 formed in the air cooling plate 600, thereby narrowing a passage through which air may move and reducing heat dissipation effect.

Accordingly, the air cooling plate 600 should have a stiffness in a preset range not to be deformed even when the battery cell 110 swells. The range of stiffness of the air cooling plate 600 may be experimentally determined.

At least one partition wall 620 may be formed in the hollow portion 610 in the air cooling plate 600 so that even when the battery cell 110 swells, the air cooling plate 600 is not deformed and the hollow portion 610 through which air passes is maintained.

A plurality of partition walls 620 may be arranged at equal intervals. As such, due to the partition walls 620 that are arranged at equal intervals, even when the battery cell 110 swells, a shape of the hollow portion 610 of the air cooling plate 600 may be maintained, and thus, cooling performance may be maintained even during the swelling of the battery cell 110.

The air cooling plate 600 may be formed of a metal material having thermal conductivity, for example, an aluminum material having excellent thermal conductivity.

However, a material of the air cooling plate 600 is not limited to aluminum.

Referring to FIG. 7, the air cooling plate 600 contacts only one surface of the battery cell 110, by considering a total height of the battery cell stack 100. However, the air cooling plate 600 may be provided to contact both surfaces of the battery cell 110.

Referring to FIG. 8, the air inlet 521 of the side end plate 520 and the hollow portion 610 of the air cooling plate 600 may be provided at the same height. In this case, air introduced through the air inlet 521 of the side end plate 520 moves through the hollow portion 610 of the air cooling plate 600 to cool the battery cells 110, moves from the air cooling plate 600 to the air circulation duct 300, and then is discharged through the exhaust fan 400.

Figure 9:
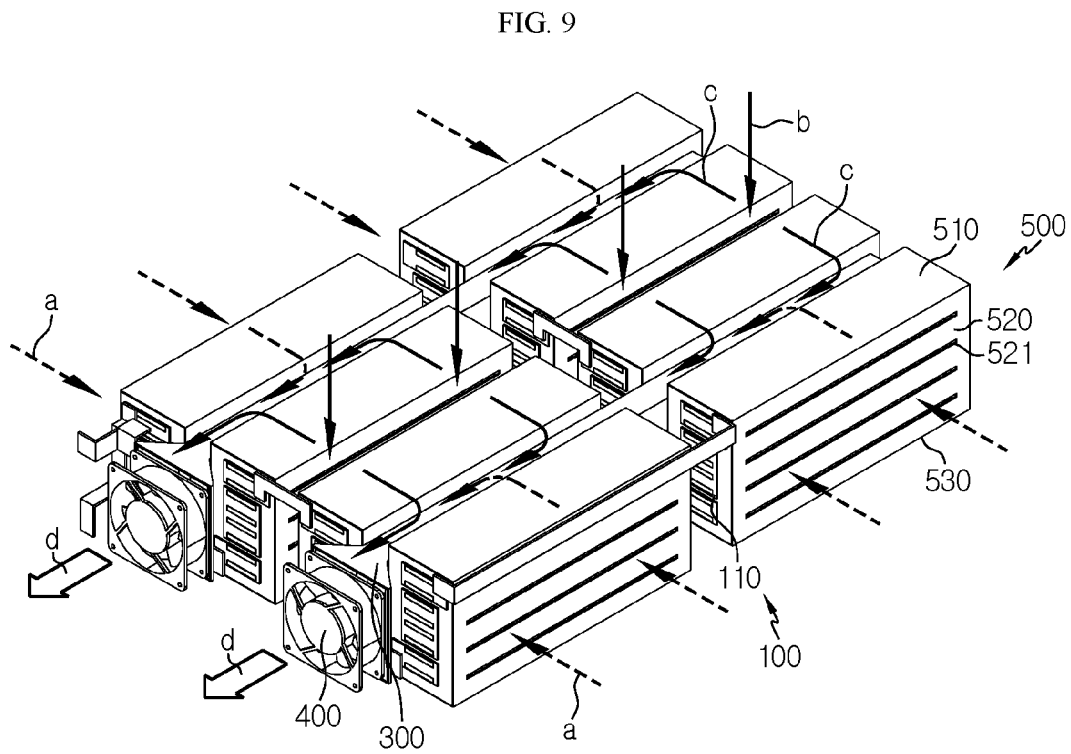
FIG. 9 is a view illustrating a movement of air in a battery module according to an embodiment of the present disclosure.

FIG. 9 is a view illustrating a movement of air in the battery module 10 according to an embodiment of the present disclosure.

An operation and effect of the battery module 10 according to an embodiment of the present disclosure will be described with reference to the drawings.

Referring to FIGS. 1 and 2, in the battery module 10 according to an embodiment of the present disclosure, the side cover 220 of the case 200 may be removed from a portion where the air inlet 521 of the side end plate 520 is located so that the air inlet 521 of the side end plate 520 is exposed to the outside.

Referring to FIG. 8, the air inlet 521 of the side end plate 520 and the hollow portion 610 of the air cooling plate 600 may be provided at the same height.

Referring to FIG. 9, when the exhaust fan 400 operates, air introduced through the air inlet 521 of the side end plate 520 (see an arrow direction a of FIG. 9) moves through the hollow portion 610 of the air cooling plate 600 to cool the battery cells 110, moves from the air cooling plate 600 through the holes 310 of the air circulation duct 300 to the air circulation duct 300, and then is discharged through the exhaust fan 400 (see an arrow direction d of FIG. 9).

In this case, referring to FIG. 6, the holes 310 of the air circulation duct 300 may be provided so that the hole 310a closest to the exhaust fan 400 has a smallest size, a size of the hole 310 increases away from the exhaust fan 400, and the hole 310b farthest from the exhaust fan 40 has a largest size, and thus, the battery cells 110 located far from the exhaust fan 400 may also be sufficiently cooled.

As shown in FIGS. 1 and 2, the air passage 211 may be formed in the upper cover 210, and air moving through the air passage 211 toward the battery cell stack 100 (see an arrow direction b of FIG. 9) passes through the air inlet 521, moves through the hollow portion 610 of the air cooling plate 600 to cool the battery cells 110, moves from the air cooling plate 600 through the holes 310 of the air circulation duct 300 to the air circulation duct 300 (see an arrow direction c of FIG. 9), and then is discharged through the exhaust fan 400 (see the arrow direction d of FIG. 9).

Due to this structure, the battery module 10 according to an embodiment of the present disclosure may easily cool the battery cells 110 and minimize a temperature difference between the battery cells 110, thereby increasing life expectancy.

A battery pack (not shown) according to an embodiment of the present disclosure may include one or more battery modules 10 according to an embodiment of the present disclosure as described above. Also, in addition to the battery module 10, the battery pack (not shown) may further include a housing for receiving the battery module 10, and various devices for controlling charging and discharging of the battery module 10, for example, a BMS, a current sensor, and a fuse.

A vehicle (not shown) according to an embodiment of the present disclosure may include the battery module 10 or a battery pack (not shown), and the battery module 10 may be included in the battery pack (not shown). The battery module 10 according to an embodiment of the present disclosure may be applied to the vehicle (not shown), for example, a certain vehicle (not shown) provided to use electricity such as an electric vehicle or a hybrid vehicle.

Although the embodiments of the present disclosure have been illustrated and described above, the present disclosure is not limited to the above-described specific embodiments. Various modified embodiments may be made by one of ordinary skill in the art without departing from the scope of the present disclosure as claimed in the claims.

INDUSTRIAL APPLICABILITY

The present disclosure relates to a battery module, and a battery pack and a vehicle including the same, and particularly, may be used in industries related to secondary batteries.

What is claimed is:

1. A battery module comprising:
a plurality of battery cell stacks, each battery cell stack including a plurality of battery cells that are stacked therein;
a case to accommodate the plurality of battery cell stacks;
an air circulation duct between the plurality of battery cell stacks and having a plurality of holes formed therein; and
an exhaust fan coupled to a side of the air circulation duct,
wherein the plurality of holes of the air circulation duct have different sizes,
wherein lengths of the plurality of holes extend in a longitudinal direction of the air circulation duct,
wherein the plurality of holes are arranged in rows and columns,
wherein for each row, the plurality of holes sequentially have increasing lengths in a direction away from the exhaust fan,
wherein for each column, the plurality of holes in the column have a same length, and
wherein a hole closest to the exhaust fan among the plurality of holes has a shortest length in the longitudinal direction of the air circulation duct and a hole farthest from the exhaust fan among the plurality of holes has a longest length in the longitudinal direction of the air circulation duct.

2. The battery module according to claim 1, wherein the plurality of battery cell stacks are arranged in at least two rows and at least two columns, and
wherein the air circulation duct is between the plurality of battery cell stacks at a location between the at least two rows or between the at least two columns.

3. The battery module according to claim 2, wherein the plurality of holes of the air circulation duct are provided so that a hole closest to the exhaust fan is has a smallest size from among the plurality of holes, and a size of the plurality of holes increases away from the exhaust fan.

4. The battery module according to claim 3, wherein the plurality of battery cells are surrounded by an end plate that comprises an upper end plate, a lower end plate, and a side end plate,
wherein an air inlet is formed in the side end plate,
wherein an air cooling plate having a hollow portion in which air flows is located between the plurality of battery cells, and wherein the air inlet of the side end plate and the hollow portion of the air cooling plate are provided at a same height of the battery module.

5. The battery module according to claim 4, wherein at least one partition wall is formed in the hollow portion of the air cooling plate.

6. The battery module according to claim 5, wherein the at least one partition wall is provided in plural, and the plurality of partition walls are arranged at equal intervals.

7. The battery module according to claim 4, wherein the case comprises an upper cover, a side cover, and a lower cover, and wherein the side cover is not located where the air inlet is located so that the air inlet is exposed to an outside.

8. The battery module according to claim 7, wherein an air passage is formed in the upper cover, and wherein air moving through the air passage toward the plurality of battery cell stacks passes through the air inlet and moves to the air circulation duct.

9. The battery module according to claim 1, wherein the plurality of holes are spaced apart from each other in a height direction and the longitudinal direction of the air circulation duct, and wherein spacings between the plurality of holes in in the height direction are constant.

10. The battery module according to claim 1, wherein the plurality of holes are arranged in a first group and a second group which are separated from each other by a region of the air circulation duct lacking the plurality of holes, the first group being closer to the exhaust fan that the second group.

11. The battery module according to claim 10, wherein the region of the air circulation duct lacking the plurality of holes has a length in the longitudinal direction of the air circulation duct that is greater than the lengths of the plurality of holes in the first group and less than the lengths of the plurality of holes in the second group.

12. A battery pack comprising the battery module according to claim 1.

13. A vehicle comprising the battery module according to claim 1.

* * * * *